(12) United States Patent
Elazari et al.

(10) Patent No.: US 10,747,334 B2
(45) Date of Patent: Aug. 18, 2020

(54) REDUCED KEYBOARD DISAMBIGUATING SYSTEM AND METHOD THEREOF

(71) Applicants: Avi Elazari, Hod Hasharon (IL); Eran Ovadia, Mevaseret Zion (IL)

(72) Inventors: Avi Elazari, Hod Hasharon (IL); Eran Ovadia, Mevaseret Zion (IL)

( * ) Notice: Subject to any disclaimer, the term of this patent is extended or adjusted under 35 U.S.C. 154(b) by 0 days.

(21) Appl. No.: 16/093,972

(22) PCT Filed: Apr. 20, 2017

(86) PCT No.: PCT/IL2017/050462
§ 371 (c)(1),
(2) Date: Oct. 16, 2018

(87) PCT Pub. No.: WO2017/183035
PCT Pub. Date: Oct. 26, 2017

(65) Prior Publication Data
US 2019/0121446 A1     Apr. 25, 2019

Related U.S. Application Data

(60) Provisional application No. 62/324,906, filed on Apr. 20, 2016.

(51) Int. Cl.
*G06F 3/023*     (2006.01)
*G06F 3/0488*     (2013.01)
*G06F 40/274*     (2020.01)

(52) U.S. Cl.
CPC .......... *G06F 3/0235* (2013.01); *G06F 3/0234* (2013.01); *G06F 3/0237* (2013.01); *G06F 3/04886* (2013.01); *G06F 40/274* (2020.01)

(58) Field of Classification Search
CPC .... G06F 3/0234; G06F 3/0235; G06F 3/0237; G06F 3/04886; G06F 40/274
See application file for complete search history.

(56) References Cited

U.S. PATENT DOCUMENTS

| | | | |
|---|---|---|---|
| 6,295,052 B1 * | 9/2001 | Kato | G06F 3/04886 345/179 |
| 2003/0121964 A1 * | 7/2003 | Crisan | G06F 3/0234 235/60 R |
| 2004/0168131 A1 * | 8/2004 | Blumberg | G06F 3/0237 715/261 |
| 2008/0218480 A1 * | 9/2008 | Badia I Farre | G06F 1/1626 345/168 |

(Continued)

*Primary Examiner* — Daniel Samwel

(57) ABSTRACT

A system, method and devices for text input system for disambiguating keystrokes entered by a user, comprising a plurality of data keys, said plurality of data keys configured to facilitate the smallest number of required language letters, and to facilitate between two to six characters per each data key, by a further smaller number of keys, including touch-based key strokes facilitating by a differential way both precise single character selection and the selection of all letters facilitated by this key, including integrated word prediction function; each of said plurality of data keys configured to facilitate at least one but no more than three characters on each side of the symmetry axis of the key, such symmetry axis can be vertical or horizontal; and are adapted for enabling entry of an at least one word by a succession of touch-based keystrokes and a word prediction function on said keyboard.

36 Claims, 12 Drawing Sheets

(56) References Cited

U.S. PATENT DOCUMENTS

| | | | |
|---|---|---|---|
| 2010/0164879 A1 | 7/2010 | Doktorova et al. | |
| 2010/0225591 A1* | 9/2010 | Macfarlane | G06F 3/0234 345/169 |
| 2011/0007004 A1* | 1/2011 | Huang | G06F 3/0237 345/173 |
| 2011/0082686 A1* | 4/2011 | Suraqui | G06F 3/0237 704/9 |
| 2011/0285651 A1* | 11/2011 | Temple | G06F 3/04883 345/173 |
| 2012/0062465 A1* | 3/2012 | Spetalnick | G06F 3/0236 345/168 |
| 2013/0339895 A1* | 12/2013 | Hirshberg | G06F 3/04886 715/773 |
| 2014/0009399 A1* | 1/2014 | Zhang | H04M 1/23 345/169 |
| 2014/0245177 A1* | 8/2014 | Maklouf | G06F 3/0236 715/752 |
| 2015/0130721 A1* | 5/2015 | Hirsch | B41J 5/10 345/168 |
| 2015/0355727 A1* | 12/2015 | Hu | G06F 3/04886 345/169 |
| 2015/0370340 A1* | 12/2015 | Papalia | G06F 1/1664 345/168 |
| 2016/0041965 A1* | 2/2016 | Ghassabian | G06F 3/005 715/261 |
| 2016/0092106 A1* | 3/2016 | Crick | G06F 3/0237 345/172 |
| 2016/0132233 A1* | 5/2016 | Ghassabian | G06F 3/0237 715/773 |
| 2016/0147310 A1* | 5/2016 | Pate | G06F 3/021 345/168 |

\* cited by examiner

| | | | | | | | | | |
|---|---|---|---|---|---|---|---|---|---|
| Square | | | | | | | | | |
| sab1 | ,AB .CD | EFG HIJ | KLM NOP | | sab2 | ABC JKL | DEF MNO | GHI PQR | |
| | ?QR !ST | UVW XYZ | DEL SPS | | | STU DEL | VWX .,! | YZ? SPS | |
| Round | | | | | | | | | |
| Rq1 | ?QW !AS | ERT DFG | YUI HJK | OP. L,@ | Rab1 | | ,AB .CD | EFG HIJ | KLM NOP |
| | DEL | ZXC :)V | BNM | SPS | | DEL | ?QR !ST | UVW XYZ | SPS |
| Rq2 | WER ASD | TYU FGH | IOP JKL | | Rab2 | ?AB !KL | CDE MNO | FGH PQR | IJ; ST: |
| | DEL | ZXC Q.V | BNM ?,! | SPS | | DEL | UVU :$%# | XYZ @() | SPS |
| | | | | | Rab3 | | ABC JKL | DEF MNO | GHI PQR |
| | | | | | | DEL | STU :$%# | VWX @() | SPS |
| Vertical | | | | | | | | | |
| | | | | vab2 | AB CD ?! | EF GH IJ | vab3 | ,AB .CD | EFG HIJ |
| vab1 | AB CD ?! | EF GH IJ | KL MN OP | | KL MN OP | QR ST ., | | KLM NOP | QR? ST! |
| | QR ST ., | UV WX YZ | DEL SPS | | UV WX YZ | DEL SPS | | UVW XYZ | DEL SPS |
| Moderate width | | | | | | | | | |
| mab1 | AB CD | EF GH | IJ KL | MN OP | mab2 | AB IJ | CD KL | EF MN | GH OP |
| | QR ST | UV WX | YZ .? | DEL SPS | | QR ?W | ST XY | UV Z. | DEL SPS |
| Wide | | | | | | | | | |
| Wq1 | QW AS | ER DF | TY GH | UI JK | OP L | | | | |
| | DEL | XC Z | VB | NM | SPS | | | | |
| Extra wide | | | | | | | | | |
| Xab1 | AB | CD | EF | GH | IJ | KL | MN | | |
| | OP | QR | ST | UV | WX | YZ | DEL:SPS | | |
| | | | | | | | | | |

Fig. 6

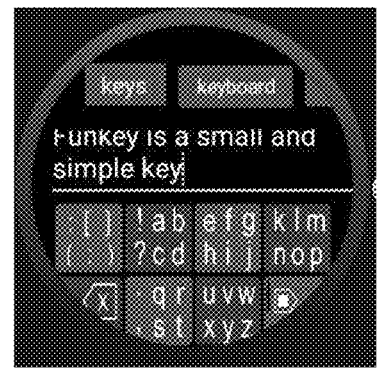
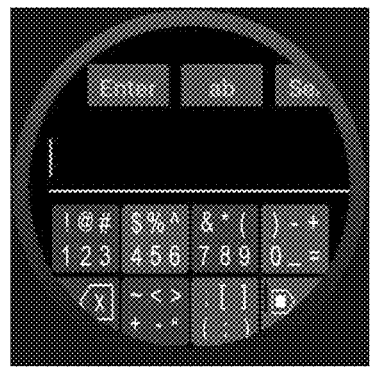
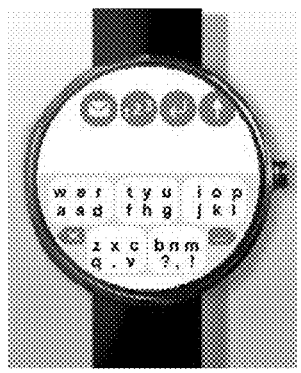
Fig. 8a  Fig. 8b  Fig. 8c
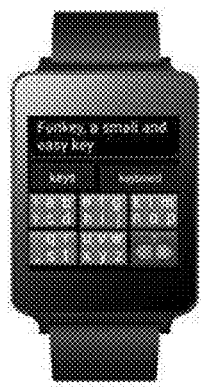
Fig. 8d  Fig. 8e  Fig. 8f

REDUCED KEYBOARD DISAMBIGUATING SYSTEM AND METHOD THEREOF

RELATED APPLICATIONS

This application is a National Phase of PCT Patent Application No. PCT/IL2017/050462, entitled REDUCED KEYBOARD DISAMBIGUATING SYSTEM AND METHOD THEREOF, having International filing date of Apr. 20, 2017, which claims the benefit of priority of U.S. Provisional Patent Application No. 62/324,906 filed on Apr. 20, 2016. The contents of the above applications are all incorporated by reference as if fully set forth herein in the entirety.

FIELD OF THE INVENTION

The present invention relates to reduced keyboard disambiguating system for resolving a user's intended entry of textual and/or data objects, and more particularly, to system and method for textual and/or data entry via user interface environment embedded in computing instruments in faster and more precise manner, preferably comprising a limited-size multi-key touch-based key.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Mobile devices often require entry of data in the form of textual data by a user in order to perform their designed functions. A typical character entry interface that meets this requirement provides a plurality of buttons, each sized to be easily pressed by a human fingertip, with one character assigned to each button and one button for each character that a user could want to select. In English-language cultures, the QWERTY keyboard is one such standard interface and this interface is commonly found on typewriters and computers.

Due to the rapid technological development of reducing the size of computing devices, electronic devices, either by design or due to a constraint, do not use the standard interface. Wearable devices are an example of an entire category of electronic mobile devices that do not typically provide a standard character entry interface. Users of limited-size and wearable devices typically demand that the device fit easily on their wrist or in the palm of their hand. To meet this requirement, portable devices cannot at the same time offer finger-sized keys and enough keys for all the letters of an alphabet. As many portable devices have functions that require character entry, this leads to a conflict between providing a user interface that offers utilized and convenient functionality but in a size that can still be carried with ease. Limitations derived from the data entry methods, such as disabled or pilots using eye or head movement or the like also to adapt to less accurate movements per keyboard size to navigate through the keyboard. Some of alternative methods, such as word disambiguation, for solving this problem exist in the prior art.

Word disambiguation methods in reduced keyboards have been previously described, based on the SMS keyboard of a cellular phone pad, though not limited to this key-set. One example is disclosed in PCT application PCT/US98/01307, by Tegic Communication, Reduced keyboard disambiguating system, disclosing a reduced keyboard disambiguating system. The keyboard has twelve keys, nine of them labeled with numerous letters and other symbols, and those nine plus one more are labeled each with one of the ten digits. Textual entry keystrokes are ambiguous. The user strikes a delimiting "Select" key at the end of each word, delimiting a keystroke sequence that could match any of many words with the same number of letters. The keystroke sequence is processed with a complete vocabulary, and words which match the sequence of keystrokes are presented to the user in order of decreasing frequency of use. In addition, stems of longer words whose initial letters match the sequence of keystrokes are also presented to the user in order of decreasing frequency of use. The first work in the presented list is automatically selected by the input of the first character in the next word. The letters are assigned to the keys in a non-sequential order which reduces chances of ambiguities. The "Select" key is pressed to select the desired word other than the first word, and spacing between words and punctuation is automatically computed. For words which are not in the vocabulary, a simultaneous unambiguous interpretation of each keystroke is performed to specify each letter of a desired word. The system simultaneously interprets all keystroke sequences as both ambiguous and unambiguous keystrokes. The user selects the desired interpretation. The system also presents to the user the number which is represented by the sequence of keystrokes for possible selection by the user.

Moreover, mobile devices comprising touch screens result in having a very limited typing area thus require even better optimization of space usage, sometimes with fewer keys. The use of keyboards having multiple characters on each key to reduce the overall size of the keyboard is known. Grover et al. in U.S. Pat. No. 5,818,437 is among one of many publications which describes a reduced keyboard disambiguating computer, the keyboard having 12 keys, 9 of them labeled with numerous letters and other symbols. Grover describes, inter alia, how the keyboard disambiguating computer is used to process a keystroke sequence with a complete dictionary, and words which match the sequence of keystrokes are presented to the user in order of decreasing frequency of use. The user selects the desired word.

Other examples employing a keyboard having 12 keys include U.S. Pat. No. 6,307,548 and 549 to Flinchem et al. and King et al, respectively, relate to a reduced keyboard disambiguating system having a keyboard with a reduced number of keys. A plurality of letters and symbols are assigned to a set of data keys so that keystrokes entered by a user are ambiguous. Due to the ambiguity in each keystroke, an entered keystroke sequence could match a number of words having the same number of letters. Each object is also associated with a frequency of use. Objects within the vocabulary modules that match the entered keystroke sequence are identified by the disambiguating system. Objects associated with a keystroke sequence that match the entered keystroke sequence are displayed to the user in a selection list.

Method for optimizing key-sets for usage in disambiguation word prediction mode was claimed in a PCT application PCT/IL2008/001522 ('522), by Avi Elazari et al. This method discloses Character input system for limited keyboards, in which a number of input keys in the keyboard is smaller than a number of characters in an input alphabet, the system comprising: a memory comprising a plurality of different mappings of said characters onto combinations of said keys; and a selector for allowing a user to select one of said mappings for character input. The different mappings are optimized for different users and different purposes, so that the user may select a mapping for simplicity of use, or one optimized for touch-typing, or for minimal key pressing or for minimal ambiguity or for other factors and combinations thereof.

Several additional methods for data entry and word disambiguating systems in mobile electronic devices exist.

WO2006059199 (A1) discloses Method for assigning large sets of characters in different modes to keys of a number keypad for low keypress-data-entry ratio, a key assignment method that assigns large sets of alphabetic and other characters and functions to the keys of a standard numeric keypad for text/data entry on an electronic device. Two letters are assigned in pairs to each key of the standard 12-key keypad in a first character mode, and other symbols, characters, or infrequently used letters are assigned in second or more optional character modes. A mode selection key is provided to select between the modes. In the first character mode, a keypress of a key selects the first letter of the pair and two keypresses in succession selects the second letter. The letter pairs may be assigned in alphabetic order, except for infrequently used letters, such as 'Q' and 'Z', or in QWERTY order, or in pairs of a more frequently-used letter with a less frequently-used letter. By comparison to the standard phone keypad layout having an average KPD=2.2, this method can achieve a KPD=1.4 or lower. The standard directional arrow keys (RDI keys) may be used for mode selection in multiple character modes. Using the RDI mode selector can transform the conventional 12-key telephone keypad into the equivalent of a 60-key data entry layout (or expandable by 60 more keys for each additional character per key per mode keystroke used), thereby allowing operation comparable to a full QWERTY keyboard of characters, with enhanced symbols and functions, and/or with multi-language character sets.

U.S. Patent 2009051572 (A1) discloses a method for Mapping alphabetic characters to a numeric keypad, a keypad comprising a plurality of numerically labeled keys wherein each key on a numeric keypad as mapped to letters of alphabet in a language, wherein a plurality of alphabetic letters are assigned to at least one key on the numeric keypad wherein a first alphabetic letter is selected from among the plurality of alphabetic letters assigned to the key, in response to a first interaction with said key, such that the first alphabetic letter is the first most frequently used letter from among said plurality of letters assigned to the key in said language.

U.S. Pat. No. 6,847,706 discloses Method and apparatus for alphanumeric data entry using a keypad, a keypad for entering letters includes an array of keys with each key being assigned to at least one letter of an alphabetical system based on the frequency of occurrence of the least one letter in a typical body of written work. The alphabetical system comprises at least one most-frequently-occurring letter that is entered by activation of the same key twice and at least one less-frequently-occurring letter that is entered by activation of two different keys.

FR2755264 (A1) discloses Alphanumeric keyboard for one-handed use, the keyboard has a group (A) of nine keys (1-9) arranged in three rows and three columns. The keys are combined electronically so that certain of them are combined in pairs or in threes to form a less frequently used letter. Single keys correspond to the most frequently used letters. A number of supplementary keys (B) provide functions such as tabulate, back space, return, delete or cursor keys. Two keys (12, 13) select the operating modes of the keyboard to enter either alphabetic or numeric characters. The nine-key layout corresponds to a conventional numeric keypad in numeric entry mode.

KR20030043532 (A) discloses Device for inputting English character in small instrument and method therefor, a device for inputting English alphabets in a small instrument and a method therefor are provided to input a desired sentence by the number of minimum input times by differently locating the English alphabets according to a use frequency. When allocating English alphabets in each button on an instrument, the English alphabets are allocated as the first to fourth characters of each button according to the use frequency of the English alphabets. One alphabet is assigned in one button. In cast that the last alphabet is outputted when several alphabets are assigned in one button, a cursor is moved to a next blank for waiting for next input. In case that access is easily performed to a button, an alphabet of a low frequency is assigned as the first character of the button.

WO2010021459 (A2) discloses English keypad for a mobile phone using a stroke adding function, an English keypad using a stroke adding function for sending English messages on a mobile phone. Conventional character input methods based on the number of presses in conventional mobile phones require much care to be taken, have a high probability of typographical errors, require a user to keep the eyes thereof on the screen of the mobile phone to accurately input characters due to the stand-by time required for inputting another character of the same key after the input of certain characters, and are inconvenient for converting between capital letters and small letters. To overcome the enumerated problems, (A@B), (CGD), (FEH), (IJK), (NML), (OQS), (PRT), (VWU), (YXZ), (.!?) are arranged in a sequence on the numeral keys 1 to 0 of a conventional keypad of a general mobile phone, and a STROKE function is set to the bottom left key * such that the first character on each key is input when the key is pressed once, the second character on each key is input when the key is pressed after pressing the STROKE button, and the last character on each key is input when the key is quickly pressed twice. Thus, all of the characters including special characters which are frequently used can be input with two presses. The keys are arranged in an order such that the second character can be easily associated by adding one stroke to the first character, similar characters are positioned on the same key, and other characters are arranged in the order of the English alphabet, as shown in the drawing. Moreover, the Caps Lock key is arranged on the position of the bottom right key # in such a manner that the Caps Lock key can be toggled for converting between capital letters and small letters. As described above, the present invention enables a user to input all of the English characters with two presses on a mobile phone, eliminates the necessity of waiting for another input after inputting characters, enables the convenient conversion between capital letters and small letters and the easy input of character messages, and reduces the time required for inputting messages.

The current technologies and prior art, taken alone or in combination, do not address nor provide a solution for data entry embedded in computing instruments having touch-screens by efficient allocation of space available on the hardware interface to facilitate efficient typing using a small number of keys usable in small screen area and combining prediction typing and accurate letter by letter typing through a seamless integration. Referring to prediction capabilities on limited-size devices, the known technologies in prior art do not take into account considerations of improved distinction between letters in a given area, quality in terms of instructive visual design and grouping of letters, as well as effective integration of letter by letter typing with prediction typing and ergonomic and typing-related statistical considerations in a comprehensive way.

Therefore, there is a long felt and unmet need for a system and method that overcomes the problems associated with the prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

It is thus an object of the present invention to provide a solution for data entry embedded in computing instruments having touch-screens, which by efficient allocation of space available on the hardware interface facilitates efficient typing using a small number of keys and minimal scrolling. The present invention is not limited to touch screens and is also applicable to other devices using moving-point based input devices such as mouse activated by any kind of body movement. The present invention discloses a keyboard comprising text input system for disambiguating keystrokes entered by a user, said keyboard comprising a plurality of data keys, said plurality of data keys configured to facilitate the smallest number of required language letters, and said plurality of data keys configured to facilitate between two to six characters per each data key, each of said plurality of data keys configured to facilitate said letters by a further smaller number of keys, including touch-based key strokes facilitating by a differential way both precise single character selection and the selection of all letters facilitated by this key, including integrated word prediction function; each of said plurality of data keys configured to facilitate at least one but no more than three characters on each side of the symmetry axis of the key, such symmetry axis can be vertical or horizontal; and said data keys are adapted for enabling entry of an at least one word by a succession of touch-based keystrokes and a word prediction function on said keyboard. Ambiguous border regions can have probabilities associating them with more than one region or direction.

According to the teachings of the present invention, there is provided a reduced keyboard disambiguating system, according to embodiments of the present invention. The reduced keyboard disambiguating system provides efficient typing using fewer keys, thereby occupying a smaller screen space, which is desirable in small devices, such as wearables. The system includes a processing unit, memory including data store in a database and/or in the memory, a screen and an input device which may either be a portion of the screen, in the form of a touch screen, or another input device mapped to fields represented on the screen. Optionally, the system further includes an audio feedback device. The system is configured to be used by substantially all types of small devices with touch screens that require data access and data entry capabilities, including devices for computing, telecommunication, navigation, gaming, music and media presentation, control devices, translation, diaries, watches and any combination thereof, as well as larger devices that use inaccurate data entry methods such as but not limited to head and eye movements and hand gestures Based on the above considerations the invention refers to a case where the number of characters included in each key is limited to no more than 6 characters and those characters are organized in two rows and/or columns. This embodiment allows consistent and symmetric use of the given space, and balances the within key region complexity and in-between key regions complexity.

The characters on each side of the symmetry axis are arranged in a single line, so that each key has two rows of characters each one of them having at least one but no more than three characters per line. The setting of up to 6 characters per key has a compact look, and with 5 or 6 keys of 6 letters most alphabetic languages have optimal coverage. This setting allows character selection by up to 6 short swipe keystrokes that are character specific. The short swipes are defined by the initiation point, which is always within the key, and the direction which is according to the angle between the key center and the location of the characters within the key-specific group of characters. Limiting the number of characters lines to two per key is necessary for allocation of distinct direction to each one of the characters on a key, as with more lines not all characters are arranged close to the key\s circumference and some characters will remain in the central region of the key where no direction can be allocated. Limiting the number of characters to three per a line enables comfortable distinction between the swipes directions It is another object of the present invention to provide a computer-implemented method of text input for disambiguating keystrokes entered by a user, said method comprising the steps of electronically facilitating the required language letters including integrated word prediction function and touch-based precise single character selection by a plurality of data keys within a keyboard; electronically facilitating symmetrically at least one but no more than three characters on each side of the symmetry axis of the key, such symmetry axis can be vertical or horizontal; electronically facilitating two rows of characters and no more than three characters per row by a plurality of data keys within a keyboard; electronically facilitating said characters by a further smaller number of keys, including touch-based key strokes facilitating by a differential way both precise single character selection and the selection of all letters facilitated by this key, including integrated word prediction function; and enabling entry of an at least one word by a succession of touch-based keystrokes and a word prediction function within said keyboard.

This dual usage by itself proved to enable effective data entry using keyboards that are much smaller than standard QWERTY keyboards.

In order to achieve an improved performance, best word prediction and convenience, the selection of appropriate key-sets is crucial.

It is another object of the present invention to provide a method for reduced keyboard disambiguation comprises steps of: determining for each keystroke a character probability value based on the input area and/or swipe direction and yielding at least one character candidate; and performing a disambiguation process based upon the at least one character candidate, thereby providing disambiguation of the input word entered based also on possible ambiguous interpretation of the key stroke.

A complete keyboard must provide a method for letter-by-letter typing without using swipes, in specific cases where swipe is disabled or user is incapable of performing accurate swipes. In addition to the tap-and-swipe this capability is also offered, within the same keyboard by presenting the plurality of characters included in a key within the area allocated for predicted words. Different type of tap such as long vs. short tap can impose presentation of all individual characters included in the tapped key, instead of presenting the list of predicted words, otherwise presented based on all letters included in the selected key. After selecting a letter out of the plurality of presented letters the disambiguation engine will offer predicted words based also on the single letter selected.

BRIEF DESCRIPTION OF THE PREFERRED EMBODIMENTS

The novel features believed to be characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings, wherein:

FIGS. 4, 4a-d schematically illustrate a method for integrated reduced keyboard disambiguation and touch-based precise character selection, based on generating a single letter and/or a group of letters, in different display layout facilitations.

Figure 5:
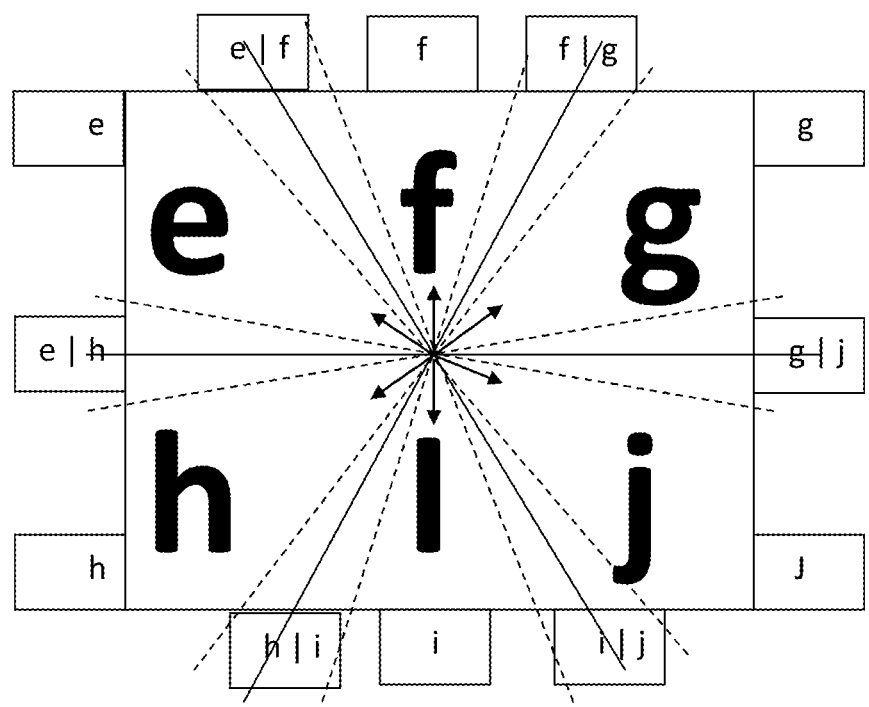

FIG. 5 schematically illustrates a method for integrated reduced keyboard disambiguation and touch-based precise character selection, based on swipe angle direction detection and correction.

FIG. 6 presents a table that provides a list of the letter combinations presented on selected keys sets, according to embodiments of the present invention.

Figure 7:
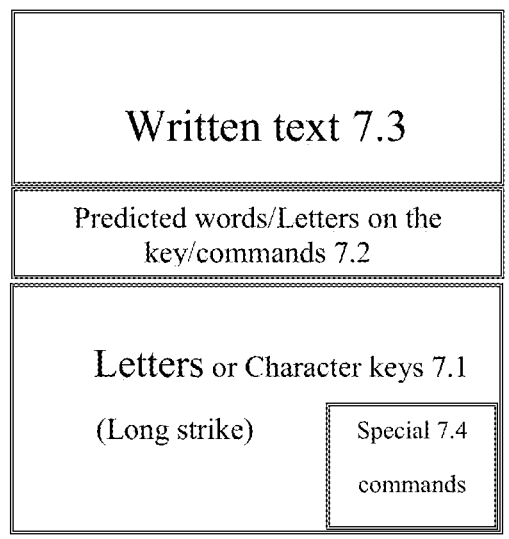
Figure 7A:
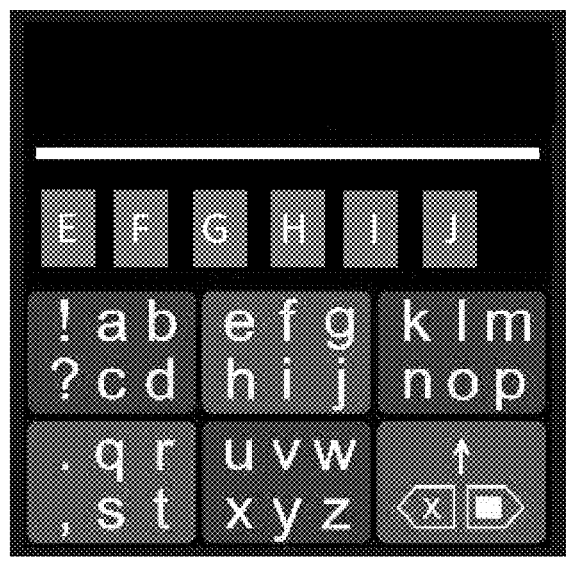
Figure 7B:
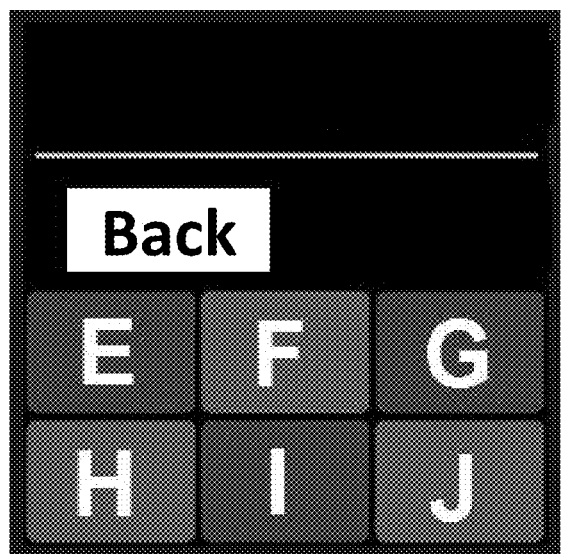

FIGS. 7, 7a and 7b schematically illustrates an example of reduced keyboard disambiguating system employing single letter selection without the swipe method of selection, according to the method of the present invention utilizing the predicted words area or full-mode presentation of all characters available in the selected key, using the same keyboard layouts of the current invention.

FIG. 8a-f depict examples of mobile devices, wherein the screen is subdivided to an application region and a keyboard region according to the shape of the device.

Figure 9:
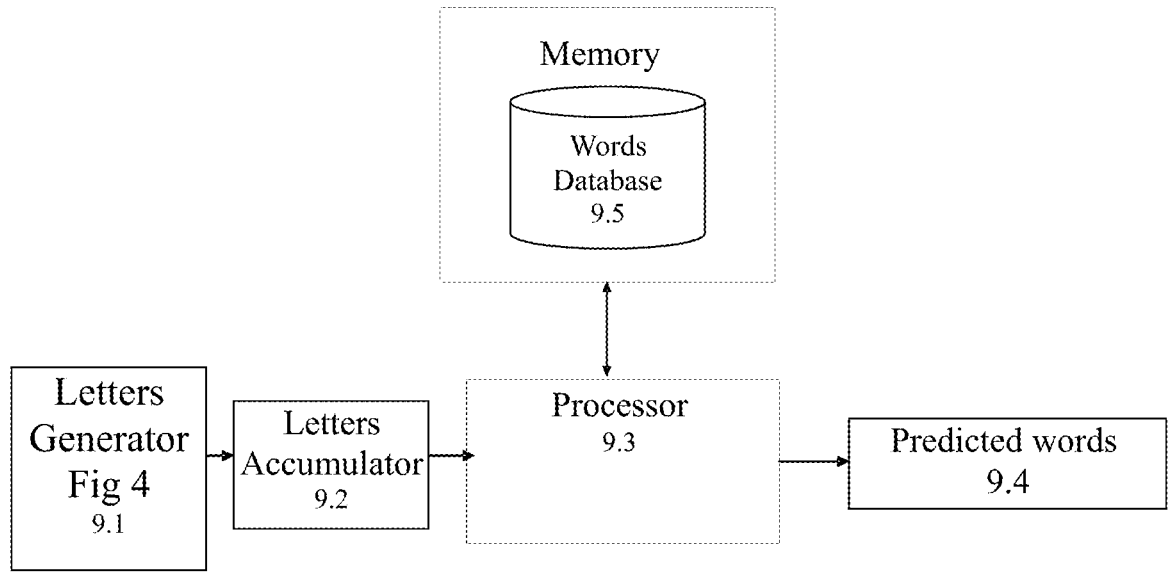

FIG. 9 schematically illustrates a system for integrated reduced keyboard disambiguation and touch-based precise character selection, based on prediction module word generation.

Figure 10A:
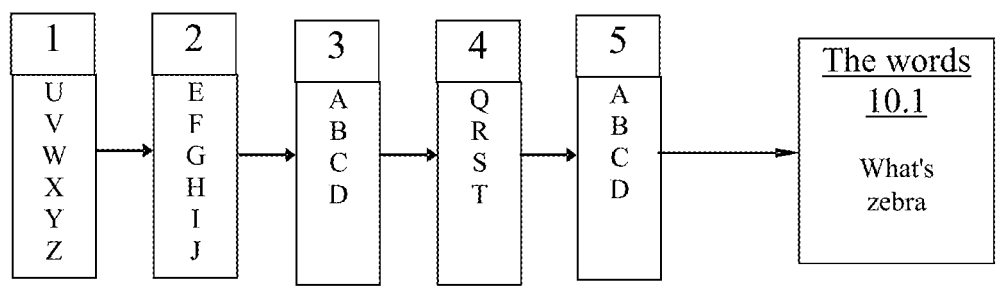
Figure 10B:
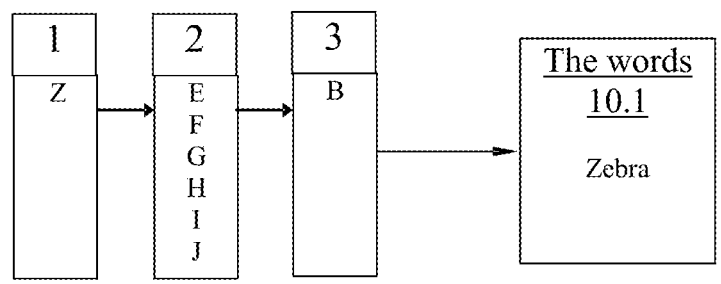

FIGS. 10a-b schematically illustrate examples of a system for integrated reduced keyboard disambiguation and touch-based precise character selection, based on letter accumulator module letter facilitation.

Figure 11:
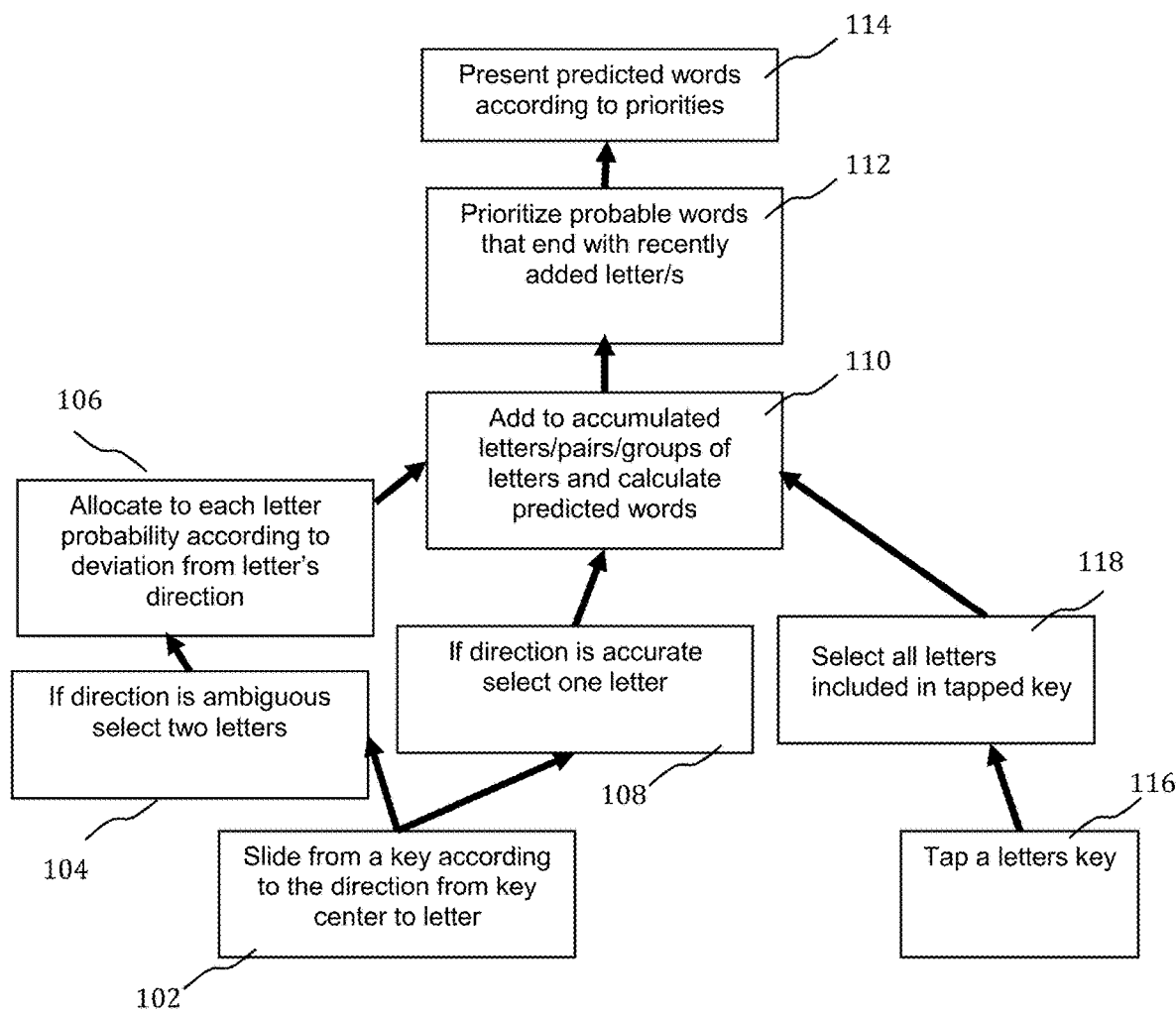

FIG. 11 shows a flow chart of a method for reduced keyboard disambiguation, comprising the swipe method of selection.

Figure 12:
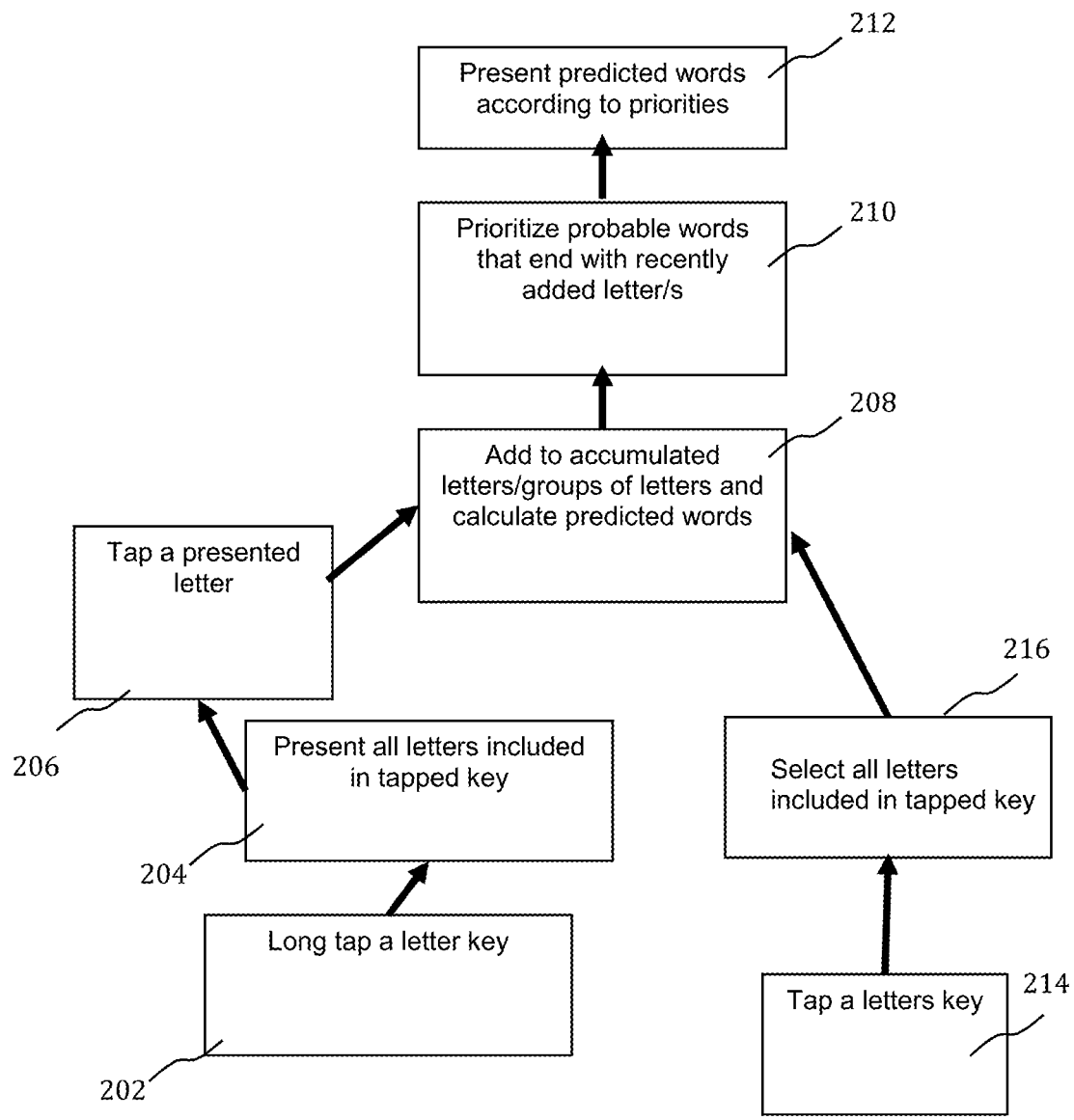

FIG. 12 shows a flow chart of a method for reduced keyboard disambiguation, comprising the long tap method of selection.

DETAILED DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "displaying", "detecting," "performing," "identifying," "configuring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

As will be explained in further detail below, the technology described herein relates to systems and methods for increasing the speed and accuracy with which a user can enter text into devices and in particular into mobile devices.

The term "mobile device" interchangeably refers, but not limited to such as a mobile phone, laptop, tablet, wearable computing device, cellular communicating device, digital camera (still and/or video), PDA, computer server, video camera, television, electronic visual dictionary, communication device, personal computer, and etc. The present invention means and methods are performed in a standalone electronic device comprising at least one screen. Additionally or alternatively, at least a portion of such as processing, memory accessible, databases, includes a cloud-based platform, and/or web-based platform. In some embodiments, the software components and/or image databases provided, are stored in a local memory module and/or stored in a remote server.

The term "display screen" interchangeably refers hereinafter to any touch-sensitive surface, known in the art, sensor or set of sensors that accepts input from the user based on haptic and/or tactile contact. The touch screen, along with any associated modules and/or sets of instructions in memory) detect contact, movement, detachment from contact on the touch screen and convert the detected contact into interaction with user-interface objects (e.g., one or more soft keys, icons, images, texts) that are displayed on the touch screen. In an embodiment, the user utilizes at least one finger to form a contact point detected by the touch screen. The user can navigate between the graphical outputs presented on the screen, and interact with presented digital navigation. Additionally or alternatively, the present application can be connected to a user interface detecting input from a keyboard, a button, a click wheel, a touchpad, a roller, a computer mouse, a motion detector, sound detector, speech detector, joystick, gaze tracker, gesture tracker and etc., for activating or deactivating particular functions. A user can navigate among and interact with one or more graphical user interface objects that represent at least visual navigation content, displayed on screen. Preferably, the user navigates and interacts with the content/user interface objects by means of a touch screen. In some embodiments the interaction is by means such as computer mouse, motion sensor, gaze tracker keyboard, voice activation, joystick, electronic pad and pen, touch sensitive pad, a designated set of buttons, soft keys, and the like.

The term "efficient typing" or "good performance typing", as used herein and which are used interchangeably, refers to typing a word on a keyboard, with minimal key strokes, increasing the speed and accuracy.

While the invention is susceptible to various modifications and alternative forms, specific embodiments thereof have been shown by way of example in the drawings and the above detailed description. It should be understood, however, that it is not intended to limit the invention to the particular forms disclosed, but on the contrary, the intention is to cover all modifications, equivalents, and alternatives falling within the spirit and scope of the invention as defined by the appended claims.

An aspect of the present invention is to provide screen layouts for maximum efficiency of screen area usage with an integrative typing of groups of letters and of letter-by-letter typing aided by embedded prediction functionality Using the same touch-screen area for the presentation of predicted words, while typing a word and for most command function keys in between words, is also an aspect of this invention. It takes advantage of the nature of the typing process, in order to save up to third of the area used by ordinary key-boards. According to the present invention, the command keys used for functions such as signs, letter-by-letter or number typing, exit or editing functions, are presented after approval of a predicted word, or before starting typing of a new word using word prediction mode, at the same area where predicted words are presented while typing the word. Under certain embodiments, such as when swiping is technically not feasible, while typing a key, all letters included in this key are initially presented in the area allocated for predicted words, or in the entire keys area. So that the user can select one of them for letter-by-letter typing.

Figure 1:
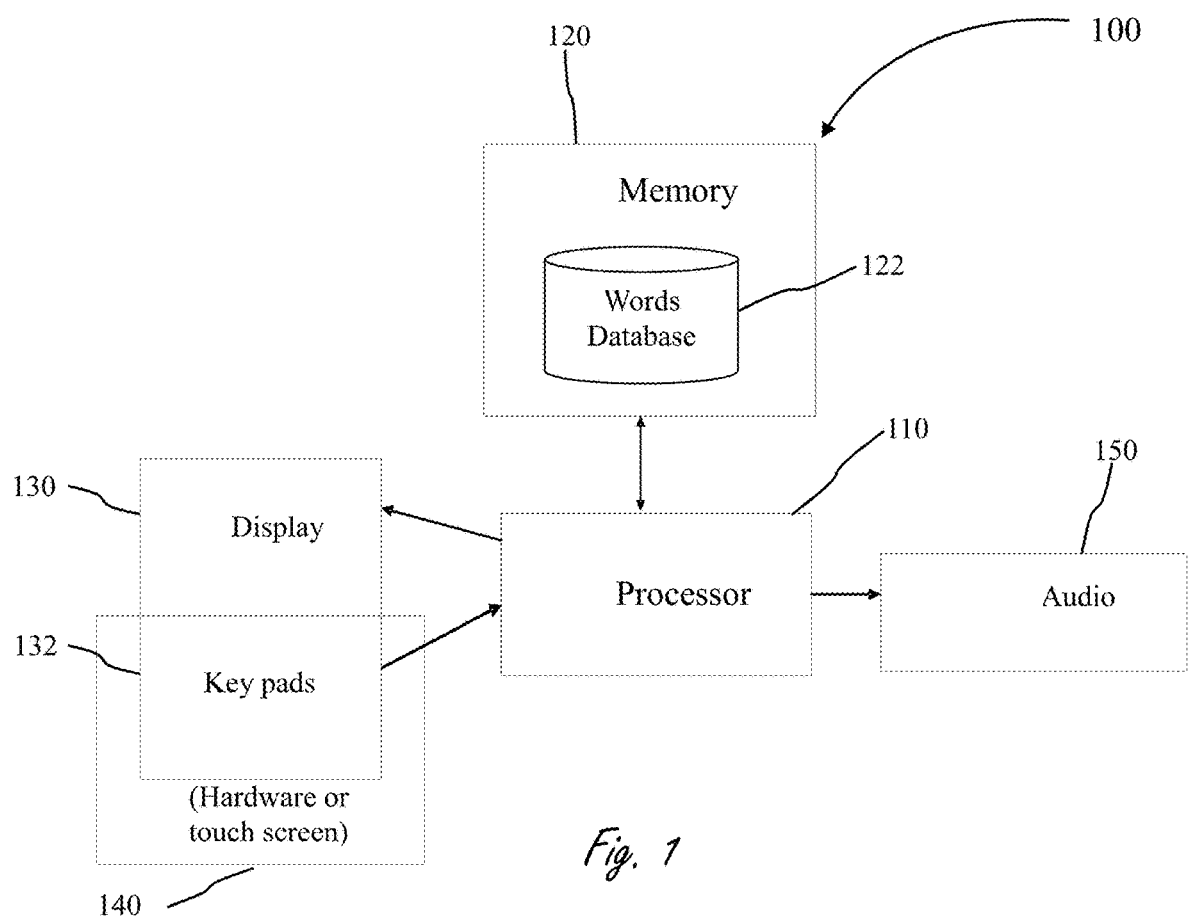
FIG. 1 and FIG. 2 is a schematic illustration of an example of a reduced keyboard disambiguation system, according to embodiments of the present invention.

Reference is now made to FIG. 1, which is a schematic illustration of an example reduced keyboard disambiguating system 100, according to embodiments of the present invention. Reduced keyboard disambiguating system 100 provides efficient typing using fewer keys, thereby occupying a smaller screen space, which is desirable in small devices. System 100 includes a processing unit 110, memory 120 including data store in a database 122 and/or memory 120, a screen 130 and an input device 140 which may either be a portion 132 of screen 130, in the form of a touch screen, or another input device mapped to fields represented on the screen. Optionally, system 100 further includes an audio feedback device 150.

Figure 2:
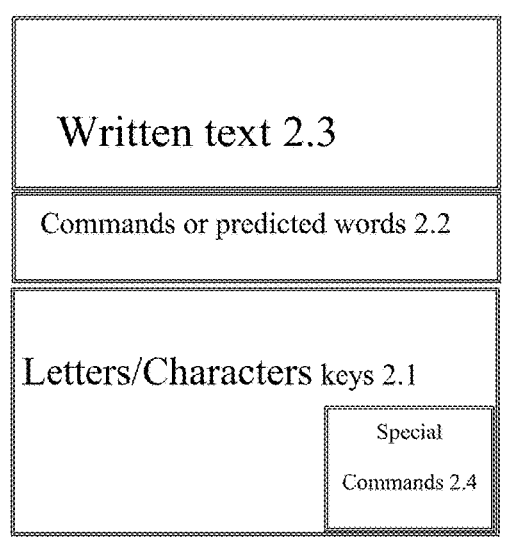

Reference is now made to FIG. 2, which is a schematic illustration of an example reduced keyboard disambiguating systems comprising: a letter layout region 2.1 configured to generate single characters and/or a group of characters; a commands or predicted words layout region 2.2 configured to generate commands, predicted words, or single letters while in the usage of the system by a user. The layout can facilitate presentation of predicted words, and if, the predicted word is generated, facilitate presentation of function commands, such as "send", "screen swap", or "exit"; a written text layout region 2.3 configured to display the textual output by the system; and special commands layout region 2.4 configured to facilitate predefined commands options, such as "shift", "delete", "space" and others. Under certain embodiments the preferred predicted word is presented within written text layout region 2.3 in order to free space in predicted words layout region 2.2 for presentation of one more predicted word.

The present invention will now be described in terms a reduced keyboard for the English language, but the present invention is not limited to reduced keyboards for the English language and applies to reduced keyboards for substantially any language.

Figure 3:
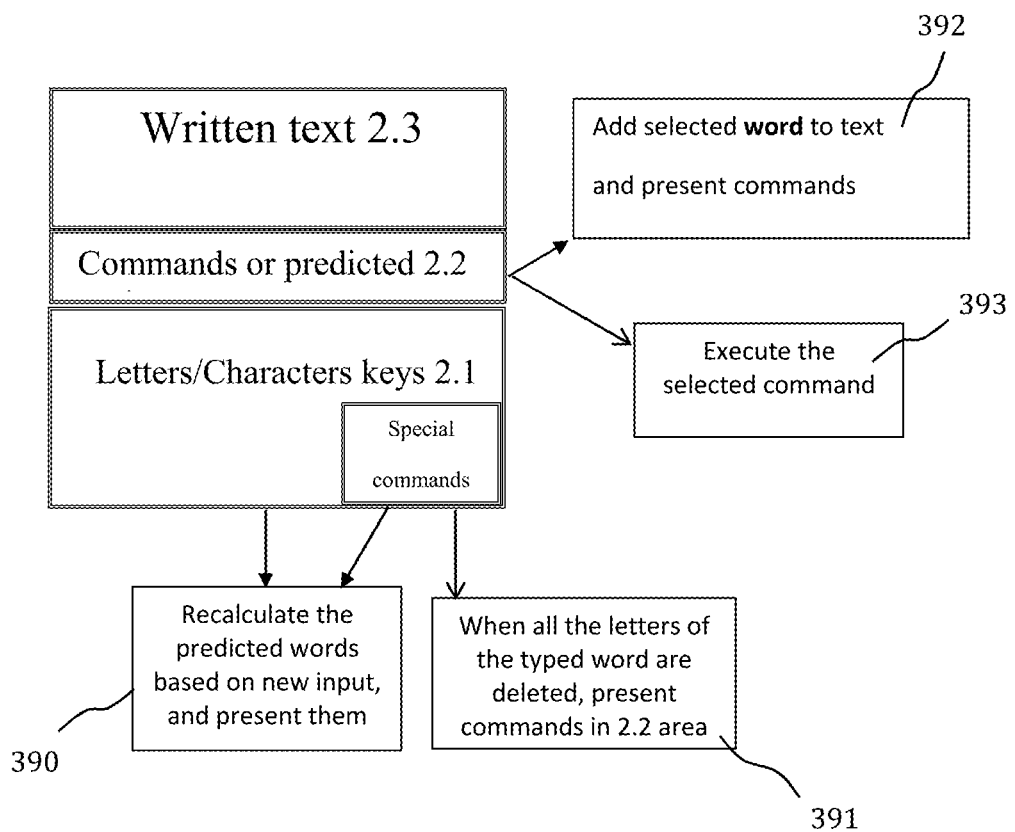
FIG. 3 is a schematic illustration of an example of a reduced keyboard disambiguation system, according to the method of the present invention.

Reference is now made to FIG. 3, which is a schematic illustration of an example reduced keyboard disambiguating system according to the method of the present invention. As referenced in FIG. 2, a user employs the letter layout region 2.1 to choose via keys a single letter or a group of letters. The letter is then added to the group of letters that were typed in before. The prediction module generates a list of all the words including said new letter or a group of new letters, based on their usage in the text of the relevant language, and if such words exist, they are presented on the commands or predicted words layout region 2.2. Each letter key in the letter layout region 2.1 is capable of immediate/instantaneous production of both a group of letters for an effective word-prediction typing, or a single letter, and is designed to visually instruct both possibilities. If the user finds the word he/she is looking for in the commands or predicted words layout region 2.2, he/she can then select it by any method of tapping, scrolling or other method of selection, and the word is directed to be presented on the written text layout region 2.3. If the user does not find or does not select the word he/she is looking for in the commands or predicted words layout region 2.2, he/she can then proceed further to choose an additional single letter or a group of letters via the letter layout region 2.1. The system then recalculates the predicted words and presents the new list in the commands or predicted words layout region 2.2. If the user deletes a letter, the system reverses the prediction function and brings previously predicted group of letter on the written text layout region 2.3. If the user deletes all letters in a word the system presents commands in the commands or predicted words layout region 2.2, Reference is now made to FIG. 4, 4*a-d*, which are schematically illustrate a method for integrated reduced keyboard disambiguation and touch-based precise character selection, based on generating a single letter and/or a group of letters, in different display layout facilitations. Each of the keys is divided by symmetrical axes to include a half of the number of characters, thus either letters or other characters, for example: in FIG. 4*a* presented a horizontal axis 401, a first diagonal axis 403 and a second diagonal axis 404 (based on roughly 60° division); in FIG. 4*b* presented a vertical axis 402, a first diagonal axis 403 and a second diagonal axis 404 (based on roughly 60° division); in FIG. 4*c* presented a horizontal axis 401, and a vertical axis 402; and in FIG. 4*d* presented a vertical axis 402 only. As presented in FIG. 4, the characters (no more than 6) are distributed based on the key layout, on each side of the symmetrical axes. For selecting a group of all the letters on the key, including the right letter, the user selects the key including the right letter by any method of tapping, scrolling or other method of selection, for example by pressing a key 422 and choosing from E F G H I J group of letters. For selecting a single letter, the user selects the right letter by the method of swipe on the key in the direction of the right letter, for example swiping on the key 422 that is presented in details in FIG. 4*a* in the direction of 416 generates the letter H. For example, as presented in FIG. 4, if the user already typed the letters KEY the words KEY, KEYS, KEYBOARD and are presented in a Written text 2.3 zone and in Commands or predicted words zone 2.2 now if the user presses on the key 424 in order to add a fourth letter to words starting with KEY, one letter of T, S, R or Q should be added and the predicted word that is displayed is KEYS. If the user swipes on the key 421 in the direction 413 of key 4*a* in order to locate words starting with KEY, and further there is a letter B, the predicted word that is displayed, is KEYBOARD.

Reference is now made to FIG. 5, which schematically illustrates a method for integrated reduced keyboard disambiguation and touch-based precise character selection, based on swipe angle direction detection and correction. The system facilitates a swipe angle range wherein two relevant letters are used by the prediction module in order to identify possible predicted words, based on the proximity of the swipe. For example, if the user swipes in the direction of a letter, there is a chance of getting its proximal letter, if the swipe was not precise, such as, if intended, swiping in the angle 0° to 60° the user receives letter G and swiping in the angle 60° to 120° the user receives letter F, however in the angle 61° there is a chance of getting letter F instead of intended letter G. For example, the system defines proximal angle of 10°, wherein in the angle range of 10° to 55°, the user receives letter G, in the angle range of 65° to 115° the user receives letter G, and in the angle range of 55° to 65° the user receives both letters G and F, while the prediction module generates predicted words based on both of the letters. Under certain embodiments the closer the direction is to one of the two letters, the higher probability given to a predicted word based on this letter and not the neighboring one. For example, 55° will be interpreted by the prediction module as the selected letter was most likely E, and less likely to be F while for 65° this will be the opposite.

Reference is now made to FIG. 6, which presents a table that provides a list of letter combinations presented on selected keys sets, according to embodiments of the present invention. For a square smartwatch display, the system facilitates: a layout with a horizontal axis, configured to generate 5 letter keys and 1 commands key, in alphabetical order sab1; a layout with a horizontal axis, configured to generate 6 letter keys, wherein commands key is facilitated instead of punctuation signs, in alphabetical order sab2. For a round smartwatch display, the system facilitates: a layout with a horizontal axis, configured to generate 6 letter keys and 2 commands key, in QWERTY order rq1; a layout with a horizontal axis, configured to generate 5 letter keys and 2 commands key, in QWERTY order rq2; a layout with a horizontal axis, configured to generate 5 letter keys and 2 commands key, in alphabetical order rab1; a layout with a horizontal axis, configured to generate 6 letter keys and 2 commands key, in alphabetical order rab2; a layout with a horizontal axis, configured to generate 5 letter keys and 2 commands key, in alphabetical order rab3. For vertical smartwatch display, the system facilitates: a layout with a vertical axis, configured to generate 5 letter keys and 1 commands key (3 keys in 2 lines), in alphabetical order vab1; a layout with a vertical axis, configured to generate 5 letter keys and 1 commands key (2 keys in 3 lines), in alphabetical order vab2; a layout with a vertical axis, configured to generate 5 letter keys with horizontal axis each, and 1 commands key (2 keys in 3 lines), in alphabetical order vab3. For a display with a wider moderate-width keyboard comprising 8 keys, the system facilitates: a layout with 7 letter keys with 4 characters in each one of them and 1 commands key, in alphabetical order mab1; another layout with 7 letter keys with 4 characters in each one of them and 1 commands key, in alphabetical order in rows mab2. For a display with a wide keyboard comprising 10 keys, the system facilitates: a layout with 4 characters keys, configured to generate 8 letter keys and 2 commands key, in QWERTY order wq1. For a display with a very wide keyboard comprising 14 keys, the system facilitates: a layout with 2 characters keys, configured to generate 13 letter keys and 1 commands key, in alphabetical order xab1.

Reference is now made to FIGS. 7, 7*a* and 7*b*, which schematically present an example of reduced keyboard disambiguating system employing single letter selection without the swipe method of selection, according to the method of the present invention, the system comprising: a letter layout region 7.1 configured to generate single characters and/or a group of characters by the method of long tap on the key and/or two or more sequential quick taps on the key; and/or an alternative distinct way to a long tap of key selection, a commands or predicted words layout region 7.2 configured to display a single character and/or a group of characters; a written text layout region 7.3 configured to display the textual output by the system; and special commands layout region 7.4 configured to facilitate predefined commands options, such as "shift", "delete", "space" and others. When the user selects a key in the letter layout region 7.1 by the selection method in a form of long tap on the key and/or two or more sequential quick taps on the key, and/or an alternative distinct way to a long tap of key selection, all the letters/characters are presented on the commands or predicted words layout region 7.2 (no change to the text in the written text layout region 7.3), as presented in FIG. 7a. The user then selects the right letter that is then added to the existing text in the written text layout region 7.3. The prediction module generates a list of all the words including said new letter or a group of new letters, based on their usage in the text of the relevant language, and if such words exist, they are presented on the commands or predicted words layout region 7.2. Reference is now made to FIG. 7b, which depicts an example of letters layout, utilizing a full-mode presentation of all available letters in a key, after selection of a long tap of this key 202 of FIG. 12. The presented layout utilizes the keys space available for the user to select characters in an easier and more precise method of tapping, scrolling, eye gazing, or any other method of selection.

Reference is now made to FIG. 8a-f which depict examples of mobile devices, wherein the screen is subdivided to an application region and a keyboard region according to the shape of the device. FIG. 8a depicts an example of a device with a round smartwatch display with alphabetic language in the text input state. FIG. 8b depicts an example of a device with a round smartwatch display with punctuation layout in the starting text input state, while the user can select additional commands. FIG. 8c depicts an example of a device with a round smartwatch display with QWERTY language in the text input state. FIG. 8d depicts an example of a vertical watch device with a vertical smartwatch display with alphabetical order in the text input state. FIG. 8e depicts an example of a device with alphabetical order in the text input state. FIG. 8f depicts an example of a device with a round smartwatch display with alphabetic language in the text input state.

Figure 4:
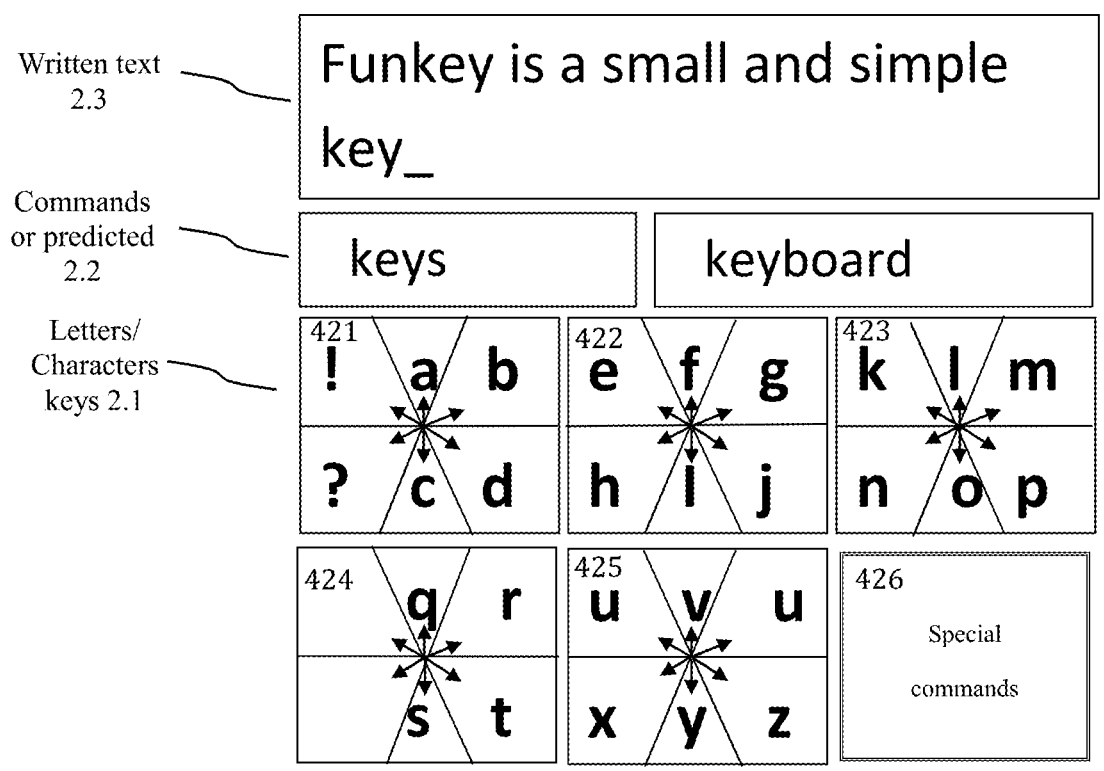
Figure 4A:
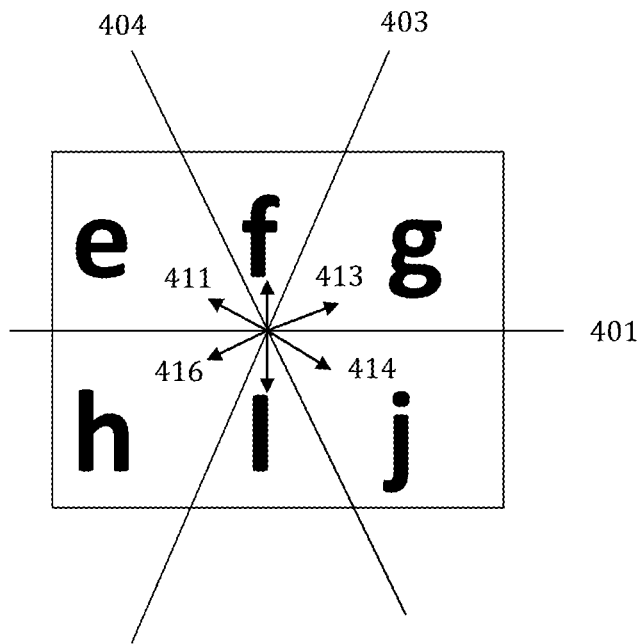
Figure 4B:
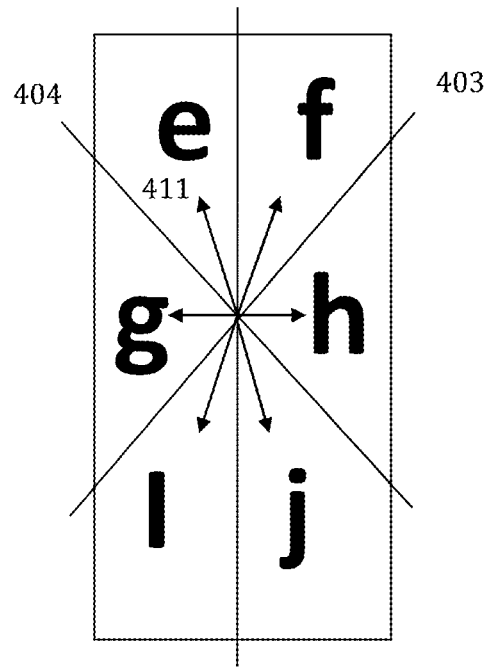
Figure 4C:
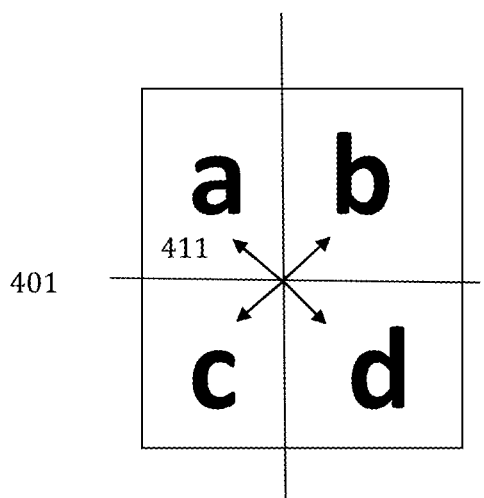
Figure 4D:
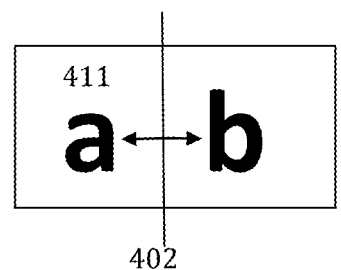

Reference is now made to FIG. 9, which schematically illustrates a system for integrated reduced keyboard disambiguation and touch-based precise character selection, based on prediction module word generation, comprising, as referenced in FIG. 4: a letters generator module 9.1 configured to generate a single letter or a group of letters; a letters accumulator module 9.2 configured to facilitate the sequence of the single letters or the group of letters added by the letters generator module 9.1, based on their selection order; a processor 9.3 configured to extract said sequence of the single letters or the group of letters added by the letters generator module 9.1, transmit said sequence to a words database 9.5 coupled to memory medium, and perform cross-reference against the words stored in the words database 9.5, configured to store words based on their statistical usage in the relevant language, to locate words that correlate to the sequence of the single letters or the group of letters added by the letters generator module 9.1, based on their selection order. The processor 9.3 then sends said chosen words to predicted words module 9.4 configured to present words based on the performed cross-reference against the words stored in the words database 9.5.

Reference is now made to FIGS. 10a-b, which schematically illustrate examples of a system for integrated reduced keyboard disambiguation and touch-based precise character selection, based on letter accumulator module letter facilitation. As referenced in FIG. 9, in FIG. 10a the letters accumulator module 9.2 is configured to facilitate the sequence of the single letters or the group of letters added by the letters generator module 9.1. In the present example, in the first step the letters accumulator module facilitates letters U V W X Y Z, in the second step the letters accumulator module facilitates letters E F G H I J, in the third step the letters accumulator module facilitates letters A B C D, in the fourth step the letters accumulator module facilitates letters Q R S T, and in the fifth step the letters accumulator module facilitates letters A B C D, which transliterates in the predicted word "zebra". In FIG. 10b, upon the selection of a letter Z, the letters accumulator module facilitates a letter Z, in the second consequent step the letters accumulator module facilitates letters E F G H I J and upon the selection of a letter E, in the third last consequent step the letters accumulator module facilitates only a letter B, which transliterates in the predicted word "zebra", after completion of only three steps.

Reference is now made to FIG. 11, which shows a method for integrated reduced keyboard disambiguation and touch-based precise character selection, comprising the swipe method of selection, the method comprising, for a number of repetitions, steps of: enabling entry of an at least one letter by a succession of swiping from a key or tapping a key; If enabling entry of an at least one letter by swiping from a key the letter is selected according to the direction from key center to the letter 102; if direction is ambiguous, selecting two letters 104; allocating to each letter probability according to deviation from letter's direction 106; if direction is unambiguous, selecting one letter 108; adding to accumulated letters/pairs/groups of letters and calculating predicted words 110; prioritizing probable words that end with recently added letter/s 112; and presenting predicted words according to the priorities 114. If enabling entry of an at least one letter is by tapping a key 116; selecting all letters included in the tapped key 118; adding to accumulated letters/pairs/groups of letters and calculating predicted words 110; prioritizing probable words that end with recently added letter/s 112; and presenting predicted words according to the priorities 114.

Reference is now made to FIG. 12, which shows a method for integrated reduced keyboard disambiguation and touch-based precise character selection, comprising the long and short tap methods of selection, the method comprising, for a number of repetitions, steps of: enabling entry of an at least one letter by a succession of taps; If a long tap of a key 202 and/or an alternative distinct way to a long tap of key selection; presenting all letters included in the tapped key 204; selecting the presented letter by a succession of tap 206; adding to accumulated letters/groups of letters and calculating predicted words 208; prioritizing probable words that end with recently added letter/s 210; and presenting predicted words according to the priorities 212. If shortly tapping a key 214; selecting all letters included in the tapped key 216; adding to accumulated letters/groups of letters and calculating predicted words 208; prioritizing probable words that end with recently added letter/s 210; and presenting predicted words according to the priorities 212.

What is claimed is:
1. A method of receiving textual input comprising:
arranging a plurality of characters on a letter layout region compactly in unbroken lines parallel to an axis;
designating for each key of a plurality of keys a portion of said letter layout region including a group of characters from said plurality of characters associated with said each key and wherein in each said portion a respective said group of characters is divided equally and symmetrically under reflection across a line of symmetry parallel to said axis;

accepting a gesture to a key of said plurality of keys wherein a selecting gesture ambiguously designates any character of the group of characters associated with the key and a directional gesture designates a specific character of the plurality of characters;

predicting a word based on a collections input characters including at least one ambiguous character.

2. The method of claim 1, wherein said designating is of a portion include at least 4 characters from said plurality of characters.

3. The method of claim 1, wherein said designating is of a portion include exactly 6 characters from said plurality of characters.

4. The method of claim 1, wherein said designating includes a set of 5 keys including the entire English alphabet.

5. The method of claim 1, wherein said designating includes a set of 6 keys including the entire English alphabet.

6. The method of claim 1, wherein said arranging is of four lines of characters including the entire English alphabet.

7. The method of claim 1, wherein said arranging and designating are on a touch screen and wherein said plurality of keys are soft keys displayed on said touch screen.

8. The method of claim 7, wherein said directional gesture includes a swipe from one of said soft keys.

9. The method of claim 7, further comprising defining on said touch screen a prediction display region.

10. The method of claim 9, further comprising defining on said touch screen a written text region.

11. The method of claim 1, wherein said designating is of a portion including six characters locations distributed as two lines of three character locations on each side of said line of symmetry.

12. The method of claim 11, wherein the English alphabet is distributed across five of said keys.

13. The method of claim 1, wherein said axis is directed in at least one direction selected from the group consisting of vertical and horizontal.

14. The method of claim 1, further comprising utilizing at least one additional data key configured to facilitate non-character-specific function selected from a group consisting of spacing, short deletion, long deletion, shift, enter, insert, copy, paste, edit, undo typing, redo typing, repeat typing, format text, bold, italic, underline, strikethrough, align, intent, find, replace, select, language switch input, and assistance function.

15. The method of claim 1, wherein said arranging includes characters for at least one natural language.

16. The method of claim 15, further wherein said arranging includes less than 36 distinct letters.

17. The method of claim 1, wherein said predicting includes calculating probabilities of each respective character to appear in a word included in at least one natural language.

18. The method of claim 1, wherein said arranging is of a QWERTY keyboard layout.

19. The method of claim 1, wherein said arranging is of an alphabetical keyboard layout.

20. The method of claim 1, further comprising: determining for each keystroke a character probability value based said gesture and yielding at least one character candidate; performing a disambiguation process based upon the at least one character candidate, thereby providing disambiguation of an input word entered.

21. The method of claim 2, wherein said directional gesture in a first direction designates one of said at least 4 characters unambiguously and wherein said directional gesture in a second direction designates two neighboring characters of said at least 4 characters ambiguously.

22. The method of claim 1, further comprising supplying a key of letter combinations that takes in account at least one factor selected from the group comprising a number of key strokes per text, need for scrolling and distribution of characters between keys for better utilization, according to a given language, number of keys and number of simultaneously presented predicted words in order to further reduce a screen area needed in small devices having touch screens for text typing, and types measuring a probability of available candidate characters to be a user's intention of a character.

23. A text input system comprising:
a letter layout region including a plurality of characters arranged compactly in unbroken lines parallel to an axis;
a plurality of keys, each key of said plurality of keys designating a portion of said letter layout region including a respective group characters from said plurality of characters, the portion having a line of symmetry parallel to said axis and wherein said respective group is positioned symmetrically under reflection across said line of symmetry with a first half of said respective group positioned on one side of said line of symmetry and second half of said respective group positioned on an opposite side of said line of symmetry;
a selection sensor for each said key that inputs an ambiguous character of said respective group of characters; and
a second sensor that accepts a direction;
wherein activation of said second sensor in a direction corresponding to a specific character inputs unambiguously said specific character;
a processor configured to receive input from said select sensor and said second sensor, said input comprising a string of characters including at least one ambiguous character and to output a predicted word matching said string
a prediction display configured for displaying said predicted word.

24. The system of claim 23, wherein said group consists of at least 4 characters.

25. The system of claim 23, wherein said group consists of 6 characters.

26. The system of claim 23, wherein the English alphabet is contained in the respective groups of a set of 5 keys.

27. The system of claim 23, wherein the English alphabet is contained in the respective groups of a set of 6 keys.

28. The system of claim 23, wherein the entire alphabet is contained in four of said lines.

29. The system of claim 23, comprising a touch screen and wherein said plurality of keys are soft keys displayed on said touch screen.

30. The system of claim 29, wherein said second sensor is configured to sense a swipe from one of said soft keys.

31. The system of claim 29, wherein said touch screen includes a said prediction display region and a written text region.

32. The system of claim 23, wherein said portion includes six characters locations distributed as two lines of three character locations on each side of said line of symmetry.

33. The system of claim 32, wherein the English alphabet is distributed across five of said keys.

34. The system of claim 24, wherein at least one direction on said second sensor results in an input of an unambiguous character and at least one other direction results in a character that is ambiguous between two of said at least 4 characters.

35. The system of claim 23, wherein said axis is directed in at least one direction selected from the group consisting of vertical and horizontal.

36. The system of claim 32, wherein the English alphabet is contained in the respective groups of a set of 6 keys.

* * * * *